Oct. 27, 1925.
C. HILL
1,559,097
COMBINED TOOL SHANK AND HANDLE THEREFOR
Filed Jan. 22, 1924   2 Sheets-Sheet 2
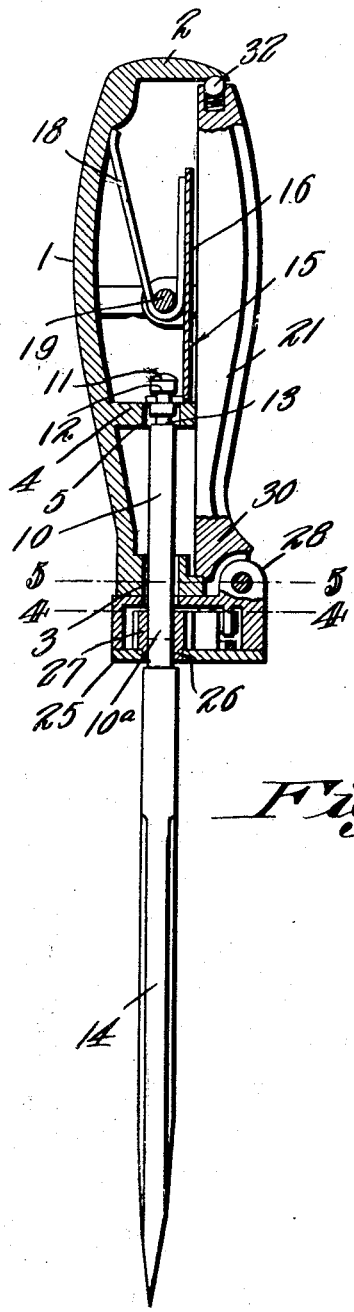
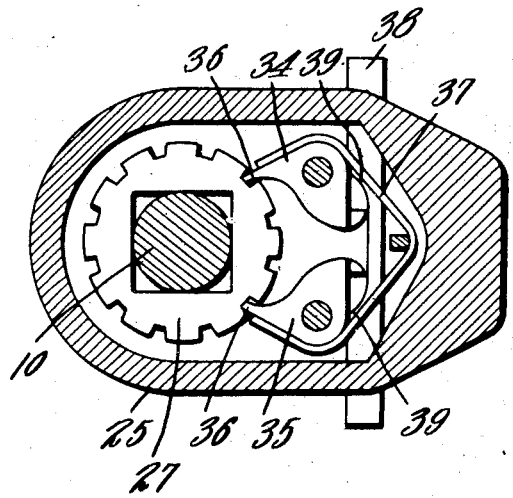
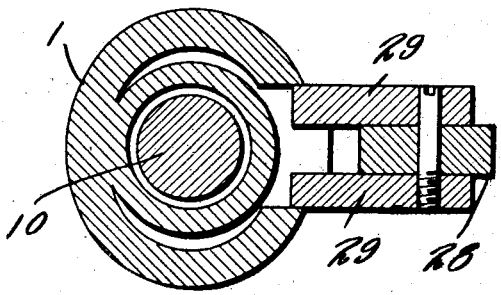
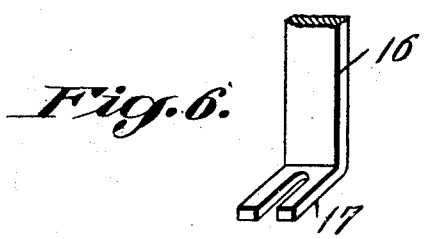
C. Hill, Inventor Patented Oct. 27, 1925.

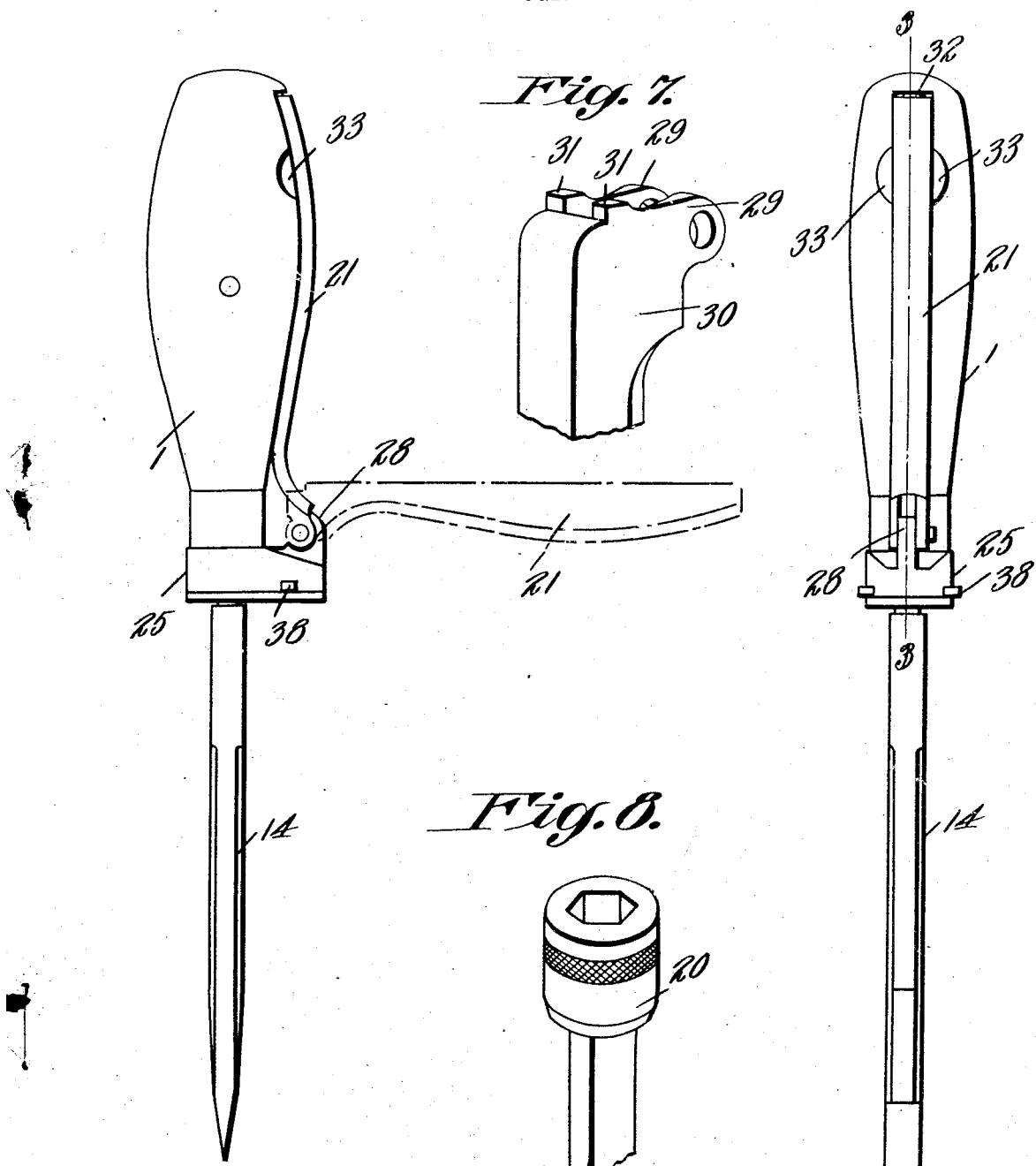

1,559,097

UNITED STATES PATENT OFFICE.

CLAUDE HILL, OF MOBERLY, MISSOURI, ASSIGNOR OF ONE-HALF TO LYMAN P. McDONALD, OF MOBERLY, MISSOURI.

COMBINED TOOL SHANK AND HANDLE THEREFOR.

Application filed January 22, 1924. Serial No. 687,812.

*To all whom it may concern:*

Be it known that I, CLAUDE HILL, a citizen of the United States, residing at Moberly, in the county of Randolph and State of Missouri, have invented a new and useful Combined Tool Shank and Handle Therefor, of which the following is a specification.

This invention relates to tools and more particularly to combined tool shanks and handles therefor.

The object of the invention is to provide a tool handle so constructed that any suitable tool shank or a shank having a tool socket may be used in connection therewith and which is equipped with means for obtaining maximum leverage for operating the tool.

Another object is to provide improved means for detachably securing the tool shank or leg in the handle.

Another object is to provide a simple and efficient operating lever which may be readily opened for use when desired and when not in use closed to form a part of the handle.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings:

Figure 1 represents a side elevation of a tool and its cooperating handle constructed in accordance with this invention.

Fig. 2 is a front elevation thereof.

Fig. 3 is a longitudinal section taken on the line 3—3 of Fig. 2 with a part of the lever broken out which shows the means for securing it in closed position.

Fig. 4 is a transverse section taken on the line 4—4 of Fig. 3.

Fig. 5 is a similar view taken on the line 5—5 of Fig. 3.

Fig. 6 is a detail perspective view of one end of the catch which secures the tool shank to the handle.

Fig. 7 is a similar view of the pivoted end of the lever; and

Fig. 8 is a detail perspective view of a tool socket to be used in connection with this handle.

In the embodiment illustrated a hollow handle 1 is shown preferably constructed of metal and closed at its outer end as shown at 2 with an opening 3 at its inner end for the passage of a tool shank or leg 10 to be used in connection with the handle.

A transverse partition 4 is formed in the handle 1 and has an opening 5 therein for the passage of the head 11 carried by the tool shank 10. Longitudinally spaced grooves 12 and 13 are formed in the shank 10 adjacent the head 11 and are designed to receive the cooperating locking lever or catch 15 which is made in the form of a metal plate or bar 16 having one end extended laterally at right angles and bifurcated as shown at 17 to straddle the tool shank in one of the grooves thereof. A plate spring 18 as well as the plate 16 are pivotally mounted on a rod 19 extending transversely through the handle as is shown clearly in Fig. 3. This spring 18 is mounted so as to hold the bifurcated end of the catch 15 in locking engagement with the tool shank said catch 15 being releasable by depressing its outer end against the tension of said spring.

The tool shank 10 may have the tool 14, here shown in the form of a screw driver, made integral therewith or it may carry a tool socket 20 so that a single shank may be employed for use in connection with a plurality of tools such as are ordinarily found on the market.

The handle 1 has an opening in one side or edge thereof extending throughout its full length and in which is mounted a lever 21 carried by a head 25 designed to be detachably mounted on the tool shank 10 and which has an angular bushing 26 mounted therein to be fixedly connected with a cooperating angular portion 10ª of shank 10 so that shank 10 will rotate with the bushing. A ratchet wheel 27 is fixed to the bushing 26 to turn therewith. This head 25 is provided on its upper or outer face at one side thereof with an apertured ear 28 which is straddled by the furcations 29 of the inner end of lever 21 and by means of which the lever is connected with the head. The pivoted ends of the lever has an enlargement 30 which carries the furcations 29 and is also equipped with lugs 31 which are designed to abut the closed portion of the inner end of the handle on the inner face thereof, said end being recessed to permit the lugs 31 to enter the handle on the closing of the lever. This lever is equipped at its free end with a spring pressed catch here shown in the form of a ball 32 which engages the inner wall of the closed end 2 of the handle and yieldably holds the lever in closed position as shown in full lines in Figs. 1, 2 and 3.

The handle 1 has recesses 33 formed in the outer edges of the opening thereof in which the lever 21 is normally mounted. These recesses 33 facilitate grasping of the lever for opening it.

Mounted in the head 25 are two spring pressed pawls or dogs 34 and 35 positioned so that the noses 36 thereof will engage the spaces between the teeth of the ratchet wheel 27 as shown clearly in Fig. 4. A spring 37 controls both of these pawls and normally holds them both in engagement with the ratchet wheel so that when in this position the head 25 will be fixed to the tool shank and adapt the tool to be turned with the head by means of the lever 21.

A pin 38 is slidably mounted in the head 25 extending transversely therethrough and has shoulders 39 for alternately engaging the heels of the respective pawls to lock one of them out of engagement with the ratchet wheel when said pin is shifted longitudinally in one direction or the other so that the tool may be turned in one direction or the other according to the position in which the pin 38 is located.

In the use of this tool the shank 10 is first inserted through head 25 being thus fixedly connected with the ratchet wheel 27 and is then passed up through the opening 3 in the handle until the head 11 passes through the opening 5 in the partition 4 with the groove 12 in the shank located in position to receive the bifurcated end of the catch member 15 which connects shank 10 with the handle and permits it to rotate relatively thereto.

The bar 38 is then adjusted according to the direction in which the tool is to be turned and the lever 21 is swung down into dotted line position shown in Fig. 1 at right angles to the tool and handle thereby affording ample leverage for the turning of the tool according to the work to be performed.

The tool socket 20 may be substituted for the tool 14 and has a shank, not shown, similar to the shank 10 for connecting it to the handle. This socket is designed to receive the shanks of tools of various kinds which may be held therein by any suitable means and on the turning of the head 25 by means of the lever 21 the tool may be operated.

I claim:—

In a device of the class described the combination with a tool shank having an annular groove; of a hollow handle having an opening in one end for the insertion of a tool shank, a transverse partition provided with a tool receiving opening, a catch member pivoted intermediate its ends in said handle and adapted to engage the shank of the tool inserted through said transverse partition, a plate spring also pivoted to said handle and bearing against said plate to normally hold it engaged with the tool shank, and to permit the shank to rotate relatively thereto, and a lever connected to rotate said shank and to be folded flat against the handle when in inoperative position.

In testimony that I claim the foregoing as my own, I have hereto affixed my signature.

CLAUDE HILL.